United States Patent Office 3,637,670
Patented Jan. 25, 1972

3,637,670
INTERMEDIATES AND PROCESS FOR PREPARING USEFUL 17α-HYDROXY-20-KETO AND 17α,21-DIHYDROXY-20-KETO PREGNANES AND DERIVATIVES THEREOF
John H. Fried, Palo Alto, Calif., assignor to Syntex Corporation, Panama, Panama
No Drawing. Filed Sept. 2, 1969, Ser. No. 854,746
Int. Cl. C07c 169/32
U.S. Cl. 260—239.55 R                    15 Claims

ABSTRACT OF THE DISCLOSURE

New processes for preparing 17α-hydroxy-20-keto and 17α,21-hydroxy-20-keto pregnanes and derivatives thereof, which compounds are useful as progestational and anti-inflammatory agents. The processes utilize the steps of converting a 17-keto steroid to the corresponding 17-methylene steroid with methylene triphenylphosphorane, converting the 17-methylene steroid to the corresponding 17-spiro-(gem-dihalocyclopropyl) steroid with a dihalocarbene, converting the 17-spiro-(gem-dihalocyclopropyl) steroid to the corresponding 17-vinylidene steroid with a lower alkyl or phenyl lithium, and oxidizing the 17-vinylidene steroid to form the corresponding product pregnanes. The 17-spiro-(gem-dihalocyclopropyl) steroid intermediates are new compounds useful, via the disclosed process, for preparing the progestational and anti-inflammatory pregnane products.

---

The present invention relates to a new process for the preparation of therapeutically valuable steroid derivatives and to novel intermediate compounds useful in this process. In particular, the present invention is directed to a process for the preparation of 17α-hydroxy-20-keto and 17α,21-dihydroxy-20-keto pregnane steroids and derivatives thereof.

Steroid compounds which bear the 17α-hydroxy-20-keto and 17α,21-dihydroxy-20-keto system, the latter commonly referred to as the dihydroxy acetone side chain, demonstrate important and potent biological activities. It is known that 17α-hydroxy-20-keto steroids, such as hydroxyprogesterone and various derivatives thereof, for example, acetoxyprogesterone, chlormadinone acetate, and the like possess progestational activity making them useful in fertility control and in the management of various menstrual disorders. It has also been demonstrated that steroids having oxygen functions at positions C-17, C-20, and C-21 possess anti-inflammatory activity which make them useful as agents for the treatment of arthritis, allergic dermatitis, contact dermatitis, and like conditions. Examples of compounds in this series of steroids which possess and have been used in accordance with such activity are betamethasone, cortisone, dexamethasone, hydrocortisone, methylprednisolone, paramethasone, prednisolone, prednisone, and triamcinolone. Many other steroids having the requisite, 17α-hydroxy-20-keto or 17α,21-dihydroxy-20-keto systems which exhibit progestational and/or corticoidal activity are known and have been described repeatedly, for example, in Steroid Drugs by Norman Applezweig; vol. 1, McGraw Hill Book Company, Inc., 1962 and vol. 2, Holden Day, Inc., 1964.

Typical 17α-hydroxy-20-keto and 17α,21-dihydroxy-20-keto compounds which are prepared in accordance herewith are those of the following partial formula

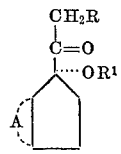

wherein A is the remainder of the steroid molecule comprising the A, B, and C rings, R is hydrogen, hydroxy, or acyloxy, and R¹ is hydrogen or acyl.

The present invention is directed to new processes useful for the preparation of 17α-hydroxy-20-keto and 17α,21-dihydroxy-20-keto steroids of the pregnane series. By employing, for the sake of convenience and simplicity, partial formulas of Ring D of the steroid molecule, the methods by which these compounds can be prepared in accordance herewith can be graphically depicted according to the following reaction sequence:

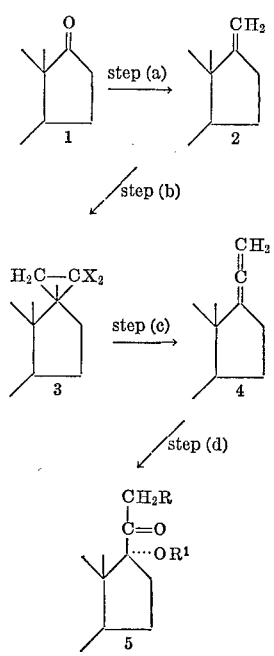

wherein X is bromo or chloro and each of R and R¹ is as defined above.

The present invention in a first, principal aspect resides in a process comprising the steps of
   (a) Treating a 17α-keto androstane (1) with methylene triphenylphosphorane to yield the corresponding 17-methylene androstane (2);
   (b) Treating the resulting 17-methylene androstane (2) with a dihalocarbene, wherein halo is bromo or chloro, to yield the corresponding 17-spiro-(gem-dihalocyclopropyl) androstane (3); and
   (c) Treating the thus prepared 17-spiro(gem-dihalocyclopropyl) androstane (3) with a lower alkyl lithium or phenyl lithium to yield the corresponding 17-vinylidene androstane (4).

The present invention in a second, principal aspect resides in a process comprising the above-defined (a), (b), (c) steps including the step (d) of oxidizing the resulting 17-vinylidene androstane (4).

In the foregoing process, the last (oxidation) step furnishes the 17α-hydroxy-20-keto or 17α,21-dihydroxy-20-keto compounds or ester derivatives thereof (5). Thus, the usefulness of the first aspect resides in the process for preparing 17-vinylidene steroids which are useful as intermediates for the preparation of the 17α-hydroxy-20-keto and 17α,21-dihydroxy-20-keto products hereof.

In accordance with the embodiments of the first aspect process of the present invention, a starting compound possessing, in part, the skeleton formula outlined by Formula 1 above is reacted together with methylene triphenylphosphorane. The reaction is conveniently conducted in the presence of an inert, aprotic organic solvent having a dielectric constant greater than about 35. Suitable inert aprotic, organic solvents having a sufficiently high dielectric constant include the di(hydrocarbon) sulfoxides such as the dialkyl sulfoxides, dicycloalkyl sulfoxides, tetramethylene sulfoxide, and the like, or N,N-dialkyl carboxylic amides such as dimethyl formamide, diethyl formamide and dimethyl acetamide. One preferred inert, aprotic organic solvent having a high dielectric constant is dimethylsulfoxide. This reaction is further conducted at a temperature ranging from about 50° C. to about 110° C. for a period of time sufficient to complete the reaction ranging from about 5 to about 18 hours.

The reaction is optionally performed under an inert gas atmosphere such as can be provided by nitrogen or argon gas. However, while the employment of an inert atmosphere for the instant process may under the most favorable circumstances be preferred, it is not an absolute necessity for the practice of the present process. The reaction may be further optionally conducted with an inert, hydrocarbon solvent or an inert, organic ether solvent having the high dielectric constant, as described above. Representative inert, hydrocarbon solvents include the alkyl hydrocarbon solvents such as hexane, heptane isoctane, decane and the like and mixtures thereof; the cycloalkyl hydrocarbon solvents such as cyclopentane, cyclohexane, and the like and mixtures thereof; and the monocyclic aryl hydrocarbon solvents such as benzene, toluene, cumene, xylene, and the like, and mixtures thereof. Representative organic ether solvents are diethyl ether, disopropyl ether, dioxane, tetrahydrofuran and the like and mixtures thereof.

The methylene triphenylphosphorane reagent for the above reaction is prepared by treating a methyl triphenylphosphonium bromide or chloride with an alkali metal hydride such as sodium hydride and lithium hydride or with a hydrocarbon lithium agent such as n-butyl lithium and phenyl lithium in a dihydrocarbon sulfoxide or organic ether solvent. In the preferred embodiment of this process, the methylene triphenylphosphorane is generated in situ, that is, in the reaction mixture of (step a) prior to the addition of starting compound (1).

With continued reference to the above reaction scheme and the process hereof, the method of (step b) outlined above is performed by reacting together a 17-methylene compound (2) with a dihalocarbene, wherein the halogen is bromo or chloro. This reaction is conveniently performed in the presence of inert, liquid organic reaction medium. Suitable media include the tertiary alkanols such as tertiary butanol, tertiary amyl alcohol and the like and mixtures thereof or a hydrocarbon solvent such as those defined above.

The halocarbene reactant is generated from a haloform and alkali metal tertiary alkoxide, an alkali or alkaline metal salt of a trihaloacetic acid, such as sodium trichloroacetate, or a phenyltrihalomethyl mercury such as phenyltribromomethyl mercury and phenyltrichloromethyl mercury.

The halocarbene reactant is prepared by reacting together a haloform, wherein the halo is defined above, with an alkali metal tertiary alkoxide. In the preferred embodiments the halocarbene is generated in situ, just prior to the addition of the 17-methylene compound (2). In one procedure, the reaction mixture containing haloform and alkali metal tertiary alkoxide is heated to the boiling point and maintained under reflux for a period of time sufficient to produce the halocarbene reactant ranging from about 30 minutes to about 5 hours. Suitable haloforms employed in the above process include bromoform, chloroform, bromodichloromethane, and chlorodibromomethane. Representative alkali metal tertiary alkaxodies employed in the above process include potassium t-butoxide and sodium t-amylate.

The reaction (step b) can also be performed by reacting together the 17-methylene compound and a phenyltrihalomethyl mercury such as phenyltribromomethyl mercury and phenyltrichloromethyl mercury. This reaction is conveniently conducted in liquid organic reaction medium, such as those listed above, and at temperatures of from about 25° C. to the boiling point of the reaction mixture.

In another procedure the methylene compound is reacted with an alkali or alkaline earth metal salt of a trihaloacetic acid in organic solvent, preferably diglyme or triglyme, and at a temperature above the decomposition temperature of the salt. In this regard, the details of U.S. 3,338,928 are hereby incorporated by reference.

With further reference to the process hereof, step (c) is performed by reacting 17-spiro(gem-dihalocyclopropyl) product of step (b), compound (3), together with an alkyl lithium or phenyl lithium. This reaction is conveniently performed in the presence of inert, liquid organic reaction medium. Suitable media include the normally employed organic solvents such as diethyl ether, tetrahydrofuran, diglyme, and so forth. This reaction is further conducted at temperatures ranging from about —50° C. to about 30° C. and for a period of time sufficient to complete the reaction ranging from about one minute to about one hour.

The reaction is optionally performed under an inert gas atmosphere such as can be provided by nitrogen or argon gas. However, while the employment of an inert atmosphere for the instant process may under the most favorable circumstances be preferred, it is not an absolute necessity for the practice of the present process.

In accordance herewith, the embodiments of the second aspect process of the present invention, the 17-vinylidene compound is prepared as described above and is then oxidized with oxidizing agent. Suitable oxidizing agents include osmium tetroxide, either alone or in combination with hydrogen peroxide; a percarboxylic acid, such as peracetic, perbenzoic, m-chloroperbenzoic, perphthalic, persuccinic, pertrifluoroacetic, and performic; phenyliodoso acetate; and morpholine. These oxidizing agents are known per se and their manners of use have been described in the literature. See Fieser and Fieser, Steroids, Rheinhold Publishing Co., New York, 1959, page 659, and Hogg et al., Journal of the American Chemical Society 77, 4438 (1955), and Miescher, Helv. Chem. Acta 33, 1840 (1950) and the references cited therein, all hereby incorporated by reference. The oxidation reaction is conveniently performed in the presence of inert, liquid organic reaction medium and at temperatures ranging from about 0° degrees cent. up to the boiling point of the reaction mixture. Suitable media include the tertiary alkanols such as tertiary butanol, tertiary amyl alcohol and the like, and mixtures thereof; the hydrocarbon solvents such as hexane, heptane, isoctane, decane, and the like, and mixtures thereof; the cycloalkyl hydrocarbon solvents, such as cyclopentane, cyclohexane, and the like, and mixtures thereof; the monocyclic aryl hydrocarbon solvents, such as benzene, toluene, cumene, xylene, and the like, and mixtures thereof; and the chlorinated methanes, such as methylene chloride, chloroform, and the like and mixtures thereof. The choice of liquid reaction media is made taking into consideration any potential interference of competition which may develop with the particular oxidizing agent employed, in accordance with the level of ordinary skill of the art.

In the practice of the oxidation step, the choice of reactants, that is, oxidizing agent dictates whether a 17α-hydroxy-20-keto compound or a 17α,21-dihydroxy-20-keto compound or a derivative thereof will be prepared. When an oxidizing agent other than a peracid is employed, the 17α,21 - dihydroxy - 20 - keto corticoid compounds are formed. These can be acylated as a second step to the corresponding 17α-hydroxy-21-acyloxy-20-keto products.

Conversely, in those instances wherein peracid is employed as oxidizing agent, a mixture of products is obtained. The compounds of this mixture are products of peracid participation in the reaction; that is, acyloxy moieties derived from the acids used are introduced in the molecule so as to prepare the 17α-acyloxy-20-keto pregnanes and 17α-hydroxy-21-acyloxy-20-keto compounds.

In carrying out the above described reaction steps, the respective starting compound and the respective reactant(s) are contacted and maintained together in any convenient order or fashion, in accordance with the preferences described. The reaction mixtures are then maintained within the given temperature range for a period of time sufficient to complete the reaction. Upon the completion of the respective reaction, the reaction mixture is processed by conventional procedures such as dilution, filtration, extraction, decantation, distillation, evaporation, chromatography, and so forth to recover and isolate the desired product.

The given reactions consume the respective reactants in the ratio of one mole of the starting compound per mole of methylene triphenylphosphorane, dihalocarbene, lower alkyl lithium or phenyl lithium, and per two moles of oxidizing agent. However, the amounts of the reactants to be employed are not critical, some of the desired product being obtained when employing any proportions thereof. In the preferred embodiments hereof, the appropriate reactants are employed in amounts ranging from about one mole to about 20 moles per mole of the respective starting steroid compound.

The process of the present invention is particularly useful for the preparation of basic pregnane compounds which exhibit progestational and anti-inflammatory activity but, more importantly, which are also very suitable as nuclei which can be further elaborated, in accordance with known and standard methods, to prepare compounds exhibiting progestational and anti-inflammatory activities considered valuably potent in the steroid art. For example, the process hereof is notably suited for the preparation of such basic compounds as hydrocortisone and cortisone or the 16-methyl or 16-hydroxy derivatives thereof first as the 4,5 - dihydro-3β-hydroxy or -3β-tetrahydropyranyloxy or -3-ketal compounds. The C-3 ether groups can then be celaved, the 3-hydroxyl oxidized to the ketone, and the Δ⁴ unsaturation introduced according to the conventional procedures described hereinafter. The 3-keto-Δ⁴ compounds can then be further elaborated as respect the introduction of C-6 and C-9 halo groups, Δ¹ unsaturation, C-11 hydroxy, and so forth to prepare such useful compounds as flumethasone, prednisolone, prednisone, fluocinolone acetonide, and the like.

Thus, the present process finds most practical use utilizing simple 17-oxo starting compounds to prepare basic pregnanes which can be elaborated further. The specific choice of starting material and the further elaboration is within the ordinary level of skill in the steroid art in accordance with the present disclosure.

In the preferred embodiments hereof, the present invention is useful for the preparation of 17α-hydroxy-20-keto and 17α,21-dihydroxy-20-keto compounds having the following Formulas A and B:

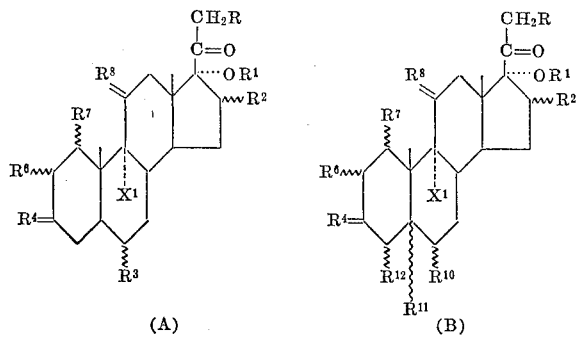

(A)                    (B)

wherein:

each of R and R¹ is as above defined;
R² is hydrogen, lower alkyl, halogenated methyl, hydroxy or a conventional hydrolyzable ester or ether thereof;
R³ is hydrogen, fluoro, chloro, bromo or methyl;
R⁴ is oxo, ethylenedioxy or the group

wherein:

R⁵ is hydrogen, hydroxy or a conventional hydrolyzable ester or ether thereof;
R⁶ is hydrogen, alkyl, halogen, hydroxy, or a conventional hydrolyzable ester thereof;
R⁷ is hydrogen, alkyl, halogen, hydroxy or a conventional hydrolyzable ester thereof, or when taken together with R⁶ oxido or methylene;
R⁸ is oxo or the group

wherein

R⁹ is hydrogen, hydroxy, or chloro;
X¹ is hydrogen, fluoro, chloro or bromo, provided X¹ is chloro when R⁹ is chloro;
R¹⁰ is hydrogen, bromo, hydroxy or a conventional hydrolyzable ester thereof;
R¹¹ is hydrogen, bromo, hydroxy or a conventional hydrolyzable ester thereof, or taken together with R¹⁰, oxido; and
R¹² is hydrogen, hydroxy or a conventional hydrolyzable ester thereof.

The compounds represented by the above Formulas A and B possess progestational or anti-inflammatory activity and are thus useful, as set forth above. In addition, however, the compounds of Formulas A and B are also useful as intermediates for the preparation of other steroids which also possess varying degrees of progestational or corticoid activity making them also useful in fertility control and in the treatment of various inflammatory conditions.

As indicated above, these compounds can be prepared directly from the corresponding 17-oxo compounds or they are obtainable, in the preferred embodiments, upon further elaboration of a basic pregnane product.

The compounds depicted and defined above which can be prepared in accordance with the processes hereof can be converted via conventional means known to one skilled in the art, to other useful derivatives. The C-17α and C-21 hydroxyl groups, if present, can be conventionally esterified, the primary alcohol requiring useful of a carboxylic acid anhydride in the presence of, for example, pyridine and the 17α-tertiary alcohol requiring use of carboxylic acid anhydride in the presence of acetic acid and p-toluenesulfonic acid. Similarly, they can be etherified to the conventional tetrahydropyran - 2-yloxy and tetrahydrofuran-2-yloxy and cyclopentyloxy ethers in accordance also with methods known in the art.

Further, the 3-keto compounds are obtained by oxidation (with chromic acid in pyridine) of a 3-hydroxy compound and the 3-keto compounds and are then treated with bromine in acetic acid in the presence of hydrogen bromide to yield the corresponding 2,4-dibromo-3-keto compound. The dibromo adduct is refluxed with sodium iodide in 2-pentanone to yield the corresponding 2-iodo-3-keto-Δ⁴ compound which, when refluxed with collidine, yields the corresponding 3-keto-Δ⁴ derivative. By refluxing the 3-keto-Δ⁴ derivative with 2,3-dichloro-5,6-dicyano-1, 4-benzoquinone in dioxane, the corresponding 3-keto-Δ¹,⁴ derivative is obtained. By refluxing the 3-keto-Δ⁴ derivative with chloranil and xylene, the corresponding 3-keto-Δ⁴,⁶ derivative is obtained. The corresponding 11β - hydroxy derivatives of the above depicted and defined compounds are prepared by incubating the C-11 dihydro compounds with any hydroxylating microorganism, such as Cunninghamella Bainieri or Curvularia Lunata, in an appropriate nutrient medium or by selective reduction of an 11-keto group.

Protection is preferably provided for those groups present in the starting compound which may compete or interfere with the principal reactions hereof or with the processes preparative to the principle reactions hereof. The examples of such protection include forming the ketal or enol ethers of the 3-keto function which may be restored later in the synthetic sequence. As another example, during the reaction with halocarbene, step (b) of the sequence outlined above, conventional hydrolyzable esters of primary and secondary hydroxyl groups on the starting and product compounds involved are cleaved by hydrolysis. These can be restored later through conventional esterification techniques. Also, the oxidation step hereof requires that any hydroxyl groups which are present on the starting material be protected by either esterifying them with a carboxylic acid anhydride such as acetic anhydride, propionic anhydride, caproic anhydride, and the like in a tertiary amine solvent such as triethyl amine, pyridine, quinoline, and the like or by etherification. A mild subsequent hydrolysis restores the hydroxyl groups.

In accordance with the above, products which can be prepared in accordance with the preferred embodiments hereof in accordance with the generic process of the present invention, the starting materials of which are represented above by partial Formula 1, are optionally substituted with alkyl, halogenated alkyl, hydroxy, acyloxy, halogeno, alkoxy, oxido, methylene, acetyl, ketal, cyano, and the like. For example, the starting materials can be substituted with 2,3-isopropylidenedioxy, 1-acetylthio, 1-cyano, 1,2-oxido, 2-alkyl, 2-formyl, 2-halo, 4-hydroxy, 4-acetoxy, 4-halo, 5-hydroxy, 5-acetoxy, 4,5-oxido, 6-hydroxy, 6-acetoxy, 6-halogenated methyl, 6-fluoro, 6-methyl, 5,6-oxido, 9-halo, 11-keto, 11-hydroxy, 11-halo, 9,11-oxido, 12-alkyl, 12-hydroxy, 15-alkyl, 15-hydroxy, 16-alkanoyloxy, 16-alkyl, 16-halogenated methyl, 15,16-oxido, 18-alkyl, 19-alkyl, 19-hydroxy, 19-carboxy, and the like.

Included within the scope of the present invention are the novel 17-spiro(gem-dihalocyclopropyl) steroids represented generically above by partial Formula 3. A preferred class of these novel 17-spiro(gem-dihalocyclopropyl) steroid intermediate compounds are those of the following Formula A:

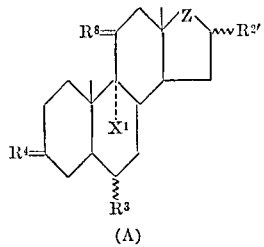

(A)

wherein Z is

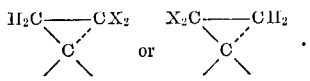

in which:

X is bromo or chloro;
R$^{2'}$ is hydrogen, methyl, hydroxy or a conventional hydrolyzable ester or ether thereof; and
each of R$^3$, R$^4$, R$^8$ and X$^1$ are as above defined and R$^8$ and X$^1$ taken together is a double bond between carbons C-9,11.

These compounds (A) are valuable intermediates useful for preparing the useful products of the process of the present invention.

In the present specification and claims, the following definitions apply.

The wavy line (∼) used in the depicted formulas indicate that the substituents attached to those positions can be either in the configuration alpha (α) or beta (β) or mixtures thereof.

The term "conventional hydrolyzable ester" denotes those hydrolyzable ester groups conventionally employed in the steroid art, preferably, those derived from hydrocarbon carboxylic acids. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain or cyclic structure, and preferably contain from 1 to 12 carbon atoms. In addition, they can be substituted by functional groups, for example, hydroxy, alkoxy containing up to six carbon atoms, acyloxy containing up to twelve carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2-chloro-4-nitro-benzoate, aminoacetate, diethylaminoacetate, piperidinoacetate, β-chloropropinoate, trichloroacetate, β-chlorobutyrate, bicyclo - [2.2.2] - octane - 1 - carboxylate,4-methylbutylo-[2.2.2]-oct-2-ene-1-carboxylate, and the like. The preferred conventional hydrolyzable ester is acetate.

"Conventional hydrolyzable ethers" include the cyclopentyl, tetrahydrofuran-2-yloxy, tetrahydropyran-2-yloxy, and 4-methoxy-tetrahydropyran-4-yloxy.

The term "lower alkyl" defines aliphatic hydrocarbons of from 1 to 6 carbon atoms including all isomers thereof. Typical lower alkyl groups are methyl, ethyl, isopropyl, t-butyl, isoamyl and n-hexyl.

The term "halogenated methyl" defines a methyl group substituted with one, two or three halogen groups, preferably chloro and fluoro. Typical halogenated methyl groups include fluoromethyl, chloromethyl, difluoromethyl, chlorofluoromethyl, trichloromethyl, trifluoromethyl, and the like.

The terms "acyl" or "acyloxy" define acyl and acyloxy groups derived from lower alkanoic acids containing from 2 to 4 carbon atoms, that is, acetic propionic, and the butyric acids or those derived from the peracids within the scope hereof.

The term "dihalocarbene" defines dibromocarbene and dichlorocarbene. As described above, the dibromocarbene and dichlorocarbene groups are generated from a corresponding haloform, the haloform containing at least two bromo halogen atoms when a dibromocarbene is desired and the haloform containing at least two chloro halogen atoms when a dichlorocarbene atom is desired. Thus, the term "haloform," as used and defined in the present specification and claims, defines a trihalogenated methane, wherein at least two of the halogens are bromo or chloro.

The dihalocarbene can also be generated from an alkali or alkaline earth trihaloacetate of which two of the halogens are bromo or chloro or from a phenyl trihalomethyl mercury of which two of the halogens are bromo or chloro.

The term "alkali metal tertiary alkoxides" defines potassium, sodium, and lithium tertiary alkoxides, wherein the alkoxide moiety contains 4, 5, or 6 carbon atoms.

The following examples typify the manner by which the present invention can be practiced and represent, in one aspect, the best mode for carrying out the invention. As such, however, they should be construed merely as illustrative and not as limitative upon the overall scope hereof.

EXAMPLE 1

Part A.—17-methylene-5α-androstane-3β-ol

To 350 ml. of dimethyl sulfoxide, there are added 25.5 g. of sodium hydride (washed several times with non-aqueous hexane). The resulting mixture is heated at 70° C. to 75° C. for 45 minutes. The resulting solution is then cooled in an ice water bath, and 121 g. of methyl triphenylphosphonium bromide in 500 ml. of dimethyl sulfoxide are added. The resulting solution is stirred at room temperature for 2½ hours; then a solution of 27 g. of 5α-androstan-3β-ol-17-one in 500 ml. of dry benzene is added dropwise to the methylene triphenylphosphorane solution and the resulting mixture stirred while heating at 85° C. for 14 hours. After cooling to room temperature, the reaction mixture is poured into ice water and extracted with hexane. The organic phase is washed with water, dried over sodium sulfate and evaporated. The crystalline residue is purified on chromatographic magnesium silicate eluting with hexane:ethyl acetate (9:1) to yield 17-methylene-5α-androstan-3β-ol.

Part B–1.—17-spiro-(gem-dibromocyclopropyl)-5α-androstane-3β-ol

A suspension of potassium t-butoxide is prepared from 2.6 g. of potassium and 42 ml. of anhydrous t-butanol. One gram of 17-methylene-5α-androstan-3β-ol dissolved in 50 ml. of dry benzene is added to the suspension at room temperature. A solution of 2.5 g. bromoform in 20 ml. of anhydrous benzene is then added dropwise into the stirred reaction mixture maintained at reflux. After the addition is complete, the refluxing is continued for an additional hour. The resulting mixture is then poured into ice water and extracted with ether. The ethereal extracts are combined, washed with water, dried over sodium sulfate and evaporated. The residue is chromatographed on silica-gel column, eluting with hexane:ethyl acetate (4:1) to yield 17-spiro-(2′,2′-dibromocyclopropyl)-5α-androstan-3β-ol and 17-spiro-(3′,3′-dibromocyclopropyl)-5α-androstan-3β-ol.

Part B–2.—17-spiro-(gem-dibromocyclopropyl)-5α-androstan-3β-ol

One gram of 17-methylene-5α-androstan-3β-ol and 2.7 grams of phenyltribromomethyl mercury are dissolved in 50 ml. of dry benzene and the resulting mixture is refluxed for three hours under an atmosphere of nitrogen. There is then added one additional gram of the mercury reagent and reflux is continued for an additional five hours after this period. After the five hour reflux period, 1.7 additional grams of mercury reagent are added and the resultant mixture refluxed for ten hours after which time 1.1 additional grams of mercury reagent are added. After the last addition, the reaction is allowed to reflux for six hours. The reaction mixture is then filtered and the filtrate is evaporated to dryness providing an oil which is chromatographed on silica-gel. The fractions are eluted with hexane:ethyl acetate to provide the 17-spiro-(2′,2′-dibromocyclopropyl) - 5α - androstan - 3β - ol and 17-spiro - (3′,3′ - dibromocyclopropyl) - 5α - androstan-3β-ol products.

Part C.—17-vinylidene-5α-androstan-3β-ol

A solution of 2.0 g. of 17-spiro-(gem-dibromocyclopropyl)-5α-androstan-3β-ol is prepared by dispersing the steroid compound in diethyl ether under a nitrogen atmosphere. Following the preparation, the solution is cooled to −10° C. After the cooling, 3 molar equivalents of n-butyl lithium in 20 ml. of diethyl ether is added to the cooled solution in a dropwise fashion with stirring. After the addition, the mixture is maintained at −10° C. for 10 minutes, after which time water is slowly added. The ether layer is then separated, washed several times with water, and dried over magnesium sulfate. The dried organic layer is then distilled to remove the solvent and the resultant concentrate subjected to chromatography to provide the 17-vinylidene-5α-androstan-3β-ol product.

Acetylation with acetic anhydride in pyridine gives the 3β-acetate.

Part D–1.—3β-acetoxy-5α-pregnane-17α,21-diol-20-one

To a solution of 500 mg. of 3β-acetoxy-17-vinylidene-5α-androstane dispersed in 25 ml. of pyridine, there is added 2.2 molar equivalents of osmium tetroxide and three drops of water. The reaction mixture is allowed to stand at room temperature for 10 days and is then stirred with 20 ml. of 5% sodium sulfite solution for 2 hours. Ether is added and the organic phase is washed with water, dried over sodium sulfate and evaporated. The residue is purified on chromatographic magnesium silicate eluting with hexane and then with hexane:ethyl acetate (4:1) to yield 3β-acetoxy-5α-pregnane-17α,21-diol-20-one.

Part D–2.—3β - acetoxy - 17α - (3′-chlorobenzoyloxy)-5α-pregnane-20-one and 3β-acetoxy-21-(3′-chlorobenzoyloxy)-5α-pregnane-17α-ol-20-one To a solution of one gram of 3β-acetoxy-17-vinylidene-5α-androstane dispersed in 20 ml. of chloroform are added 1.3 g. of 85% m-chloroperbenzoic acid. The resultant reaction mixture is allowed to stand at room temperature for 24 hours. After this period it is extracted with sodium bicarbonate, dried over sodium sulfate and evaporated. The residue after evaporation is chromatographed on Florisil eluting with benzene:2% ethyl acetate to provide the 3β-acetoxy - 17α - (3′-chlorobenzoyloxy)-5α-pregnane-20-one and the 3β-acetoxy-21-(3′-chlorobenzoyloxy) - 5α - pregnane-17-ol-20-one products.

EXAMPLE 2

Part A.—9α-fluoro-17-methylene-5α-androstane-3β,11β-diol

A mixture of 1 l. of dimethylsulfoxide and 1 mole of lithium hydride is prepared and heated for 1 hour at about 70° C. The resulting mixture is cooled and to the cooled mixture are added 357 g. of methyl triphenylphosphonium bromide dispersed in 1.5 l. of dimethylsulfoxide. The mixture is maintained under a nitrogen atmosphere. The resulting reaction mixture is stirred for 5 hours at room temperature. After this time a solution of 364 g. of 3β-acetoxy-9α-fluoro-5α-androstan-11β-ol-17-one in 7.5 l. of xylene is slowly added with stirring. After the addition is complete, the mixture is stirred and heated to and maintained at 50° C. for 48 hours. The reaction mixture is then allowed to cool, is poured into ice water and extracted with methylene chloride. The extracts are combined, washed with water, dried over sodium sulfate and evaporated. The residue is chromatographed on magnesium silicate, eluting with hexane:ethyl acetate (9:1) to yield 9α-fluoro-17-methylene-5α-androstane-3β,11β-diol.

Part B.—9α-fluoro-17-spiro-(gem-dichlorocyclopropyl)-5α-androstane-3β,11β-diol To a refluxing mixture of 258 g. of 9α-fluoro-17-methylene-5α-androstane-3β,11β-diol, 90 g. of potassium tertiary pentoxide, 5 l. of tertiary amyl alcohol, and 13 l. of dry toluene, there is slowly added a solution of 100 g. of chloroform dispersed in 1 l. of anhydrous toluene. After the addition, the mixture is refluxed for an additional 5 hours; then it is cooled and poured into ice water. The resulting aqueous mixture is extracted with diethyl ether; the extracts are combined, washed with water, dried over sodium sulfate and evaporated. The residue is chromatographed on silica-gel eluting with hexane:ethyl acetate (4:1) to yield 9α-fluoro-17-spiro-(2′,2′-dichlorocyclopropyl)-5α-androstane-3β,11β-diol and 9α-fluoro-17-spiro-(3′,3′-dichlorocyclopropyl)-5α-androstane-3β,11β-diol.

By employing 132 g. of bromodichloromethane and 168 g. of chlorodibromomethane in place of chloroform in the above process, the following are obtained, respectively: 9α-fluoro-17-spiro-(2′,2′-dichlorocyclopropyl)-5α-androstane- 3β,11β-diol and the 3′,3′-dichlorocyclopropyl derivative thereof, and 9α-fluoro-17-spiro-(2′-bromo-2′-chlorocyclopropyl)-5α-androstane-3β,11β-diol and the 3′-chloro-3′-bromocyclopropyl derivative thereof.

Part C.—9α-fluoro-17-vinylidene-5α-androstane-3β, 11β-diol

A solution of 20 g. of 9α-fluoro-17-spiro-(gem-dichlorocyclopropyl)-5α-androstane-3β,11β-diol dispersed in 500 ml. of dry diglyme is prepared. The solution is placed and maintained under a nitrogen atmosphere and is then cooled to −70° C. After the solution has reached the lowered temperature, 5 molar equivalents of methyl lithium in diethyl ether is added in a dropwise fashion and with stirring. The reaction mixture is then allowed to warm to room temperature and water is slowly added. The ether layer is separated from the aqueous layer and then is washed several times with water and dried over magnesium sulfate. The solvent is removed by distillation and the concentrate chromatographed to furnish the 9α-fluoro-17α-vinylidene-5α-androstane-3β,11β-diol product.

Acetylation affords 3β-acetoxy-9α-fluoro-17-vinylidene-5α-androstan-11β-ol.

Part D-1.—9α-fluoro-5α-pregnane-3β,11β,17α,21-tetraol-20-one

A mixture of 175 g. of 9α-fluoro-17-vinylidene-5α-androstane-3β,11β-diol and 1.5 l. of diisopropyl ether is added to a mixture of 102 g. of osmium tetroxide, 500 ml. of diisopropyl ether and 5 ml. of water. The resulting mixture is stirred for 4 days at 40° C., cooled and filtered. The filtrate is washed with aqueous sodium thiosulfate solution and water, dried over magnesium sulfate and evaporated. The residue is chromatographed on magnesium silicate eluting with isooctane to yield the 9α-fluoro-5α-pregnane-3β,11β,17α,21-tetraol-20-one product.

Acylation using acetic anhydride, propionic anhydride and caproic anhydride in place of acetic anhydride in the above process, wherein 3β,21-diacetoxy-9α-fluoro-5α-pregnane-11β,17α-diol-20-one,
3β,21-dipropionyloxy-9α-fluoro-5α-pregnane-11β,17α-diol-20-one and 3β,21-dicaproyloxy-9α-fluoro-5α-pregnane-11β,17α-diol-20-one are respectively obtained.

Part D-2.—3β,17α - diacetoxy - 9α - fluoro - 5α - pregnane - 11β - ol - 20 - one and 3β,21 - diacetoxy - 9α-fluoro-5α-pregnane-11β,17α-diol-20-one To a mixture of 60 g. of sodium carbonate which is dispersed in 150 ml. of methylene chloride, are added 30 ml. of 13% peracetic acid with stirring and at room temperature. The mixture is allowed to stand at room temperature for 75 minutes after which time it is filtered. Sodium sulfate is added to the filtrate and this mixture is again filtered. To the filtrate are added three grams of sodium carbonate and one gram of 3β - acetoxy - 9α-fluoro - 17 - vinylidene - 5α - pregnane 11β - ol. The resultant mixture is stirred at room temperature for 24 hours after which time it is subjected to a vacuum of 20 mm. Hg. to remove the methylene chloride. Ethyl acetate is added to the mixture and the resulting mixture is extracted with sodium bicarbonate, water and a saturated solution of sodium chloride. The resulting solution is evaporated to a residue which is chromatographed on Florisil eluting with benzene: 2% ethyl acetate to provide the 3β,17α - diacetoxy - 9α - fluoro -5α - pregnane - 11β-ol - 20 - one and 3β,21 - diacetoxy - 9α - fluoro 5α - pregnane-11β,17α-diol-20-one products.

EXAMPLE 3

Part A.—16α-methyl-17-methylene-5α-androstan-3β-ol-11-one

A mixture of 25 ml. of dimethylformamide and 1 g. of potassium hydride is prepared. To the resulting mixture is added a solution of 2 g. of methyl triphenylphosphonium bromide dispersed in 50 ml. of dimethylformamide. The resulting reaction mixture is stirred for 5 hours at room temperature. After this period, a solution of 1 g. of 3β - propionyloxy - 16α - methyl - 5α - androstane-11,17-dione (prepared from 16α - methylandrost - 4 - ene-3,11,7-trione by selectively reducing the latter with lithium aluminum hydride and tetrahydrofuran to yield the corresponding 3-hydroxy compound, selectively hydrogenating this with a molar equivalent of hydrogen gas in the presence of a 5% palladium-on-charcoal catalyst, and then esterifying with propionic anhydride in pyridine in 2.5 l. of toluene) are slowly added thereto with stirring. After the addition is complete, the mixture is stirred while heating at 50° C. for 48 hours. The reaction mixture is then allowed to cool, is poured into ice water and extracted with methylene chloride. The extracts are combined, washed with water, dried over sodium sulfate and evaporated. The residue is chromatographed on chromatographic magnesium silicate, eluting with hexane:ethyl acetate (9:1) to yield 16α - methyl - 17 - methylene-5α-androstan-3β-ol-11-one.

Part B-1.—16α-methyl-17-spiro-(gem-dibromocyclopropyl)-5α-androstan-3β-ol-11-one To a refluxing mixture of 186 g. of 16α-methyl-17-methylene - 5α - androstan - 3β - ol - 11 - one, 207 g. of sodium, 3.5 l. of tertiary pentanol and 0.5 l. of anhydrous xylene, there is slowly added a solution of 759 g. of bromoform in 4.5 l. of anhydrous toluene. After the addition, the mixture is refluxed for an additional 3 hours. It is then cooled and poured into ice water. The resulting aqueous mixture is extracted with diethyl ether, the extracts are combined, washed with water, dried over sodium sulfate and evaporated. The residue is chromatographed on silica-gel eluting with hexane:ethyl acetate (4:1) to yield 16α - methyl - 17 - spiro - (2′,2′ - dibromocyclopropyl) - 5α - androstan - 3β - ol - 11 - one and 16α - methyl - 17 - spiro - (3′,3′ - dibromocyclopropyl)-5α-androstan-3β-ol-11-one.

Part B-2.—16α-methyl-17-spiro-(gem-dibromocyclopropyl)-5α-androstan-3β-ol-11-one The procedure set forth in Part B-2 of Example 1 is repeated using 16α - methyl - 17 - methylene - 5α - androstan - 3β - ol - 11 - one as the starting compound to provide the corresponding 16α - methyl - 17 - spiro-(2′,2′-dibromocyclopropyl) - 5α - androstan - 3β - ol - 11 - one and 16α - methyl - 17 - spiro - (3′,3′ - dibromocyclopropyl)-5α-androstan-3β,11-one products.

Part C.—16α-methyl-17-vinylidene-5α-androstan-3β-ol-11-one

A diethyl ether, phenyl lithium solution is prepared under a nitrogen atmosphere. While maintaining the nitrogen atmosphere, the solution is cooled to −80° C. After the mixture has reached this temperature, 0.5 g. of 16α - methyl - 17 - spiro - (gem - dibromocyclopropyl)-5α - androstan - 3β - ol - 11 - one is added to the solution. The resultant mixture is then allowed to stand at about −80° C. for 15 minues, after which time it is allowed to slowly attain room temperature. After room temperature has been reached, water is cautiously added to the reaction mixture. The organic layer is then separated and removed from the aqueous layer and is washed several times with water to neutrality. The neutral organic layer is then dried over magnesium sulfate and the bulk of the solvent removed by distillation. The concentrated material is chromatographed to obtain the 16α - methyl - 17-vinylidene15α-androstan-3β-ol-11-one product.

Part C-1.—3β-acetoxy-16α-methyl-17-vinylidene-5α-androstan-11-one

A mixture of 204 g. of 16α-methyl-17-vinylidene-5α-androstan-3β-ol-11-one, 600 ml. of pyridine and 300 ml. of acetic anhydride is allowed to stand at room temperature for 24 hours. The mixture is then poured into ice water and the solid which forms is collected by filtration, washed with water and dried to yield 3β-acetoxy-16α-methyl-17-vinylidene-5α-androstan-11-one which is further purified through recrystallization from acetone:hexane.

Part D.—3β-acetoxy-16α-methyl-5α-pregnane-17α,21-diol-11,20-dione

A mixture of 166 g. of 3β-acetoxy-16α-methyl-17-vinylidene-5α-androstane-11-one in 1.5 liters of tetrahydrofuran is added to a mixture of 456 g. of osmium tetroxide, 500 ml. of tetrahydrofuran and 5 ml. of water. The resulting mixture is stirred for 20 days at 30° C., cooled and filtered. The filtrate is washed with aqueous sodium thiosulfate solution and water, dried over sodium sulfate and evaporated. The residue is chromatographed on chromatographic magnesium silicate eluting with cyclohexane to yield 3β-acetoxy-16α-methyl-5α-pregnane - 17α,21 - diol-11,20-dione.

EXAMPLE 4

Part A.—3,3-ethylenedioxy-17-methylene-5α-androstan-16α-ol

To 350 ml. of dimethyl sulfoxide, there are added 25.5 g. of sodium hydride (washed several times with non-aqueous hexane). The resulting mixture is heated at 70 to 75° C. for 45 minutes. The resulting solution is cooled in an ice water bath, and 121 grams of methyl triphenylphosphonium bromide in 500 ml. of dimethyl sulfoxide are added. The resulting solution is stirred at room temperature for 2½ hours. After this time, a solution of 27 g. of 3,3-ethylenedioxy-5α-androstan-16α-ol-17-one in 500 ml. of dry benzene is added dropwise to the methylene triphenylphosphorane solution and the resulting mixture stirred and heated at 85° C. for 14 hours. After cooling to room temperature, the reaction mixture is poured into ice water and extracted with hexane. The organic phase is washed with water, dried over sodium sulfate and evaporated. The crystalline residue is purified on chromatographic magnesium silicate eluting with hexane:ethyl acetate (4:1) to yield 3,3-ethylenedioxy-17-methylene-5α-androstan-16α-ol.

Similarly, 3β - tetrahydropyran - 2'-yloxy-17-methylene-5α-androstan-16α-ol is prepared from 3β-tetrahydropyran-2'-yloxy-5α-androstan-16α-ol-17-one.

Part B.—3,3-ethylenedioxy-17-spiro-(gem-dibromo-cyclopropyl)-5α-androstan-16α-ol A suspension of potassium t-butoxide is prepared from 2.6 g. of potassium and 42 ml. of anhyrous t-butanol. One gram of 3,3 - ethylenedioxy - 17-methylene-5α-androstan-16α-ol dissolved in 50 ml. of dry benzene is added to the suspension at room temperature. A solution of 2.5 g. of bromoform in 20 ml. of anhydrous benzene is then added dropwise and with stirring to the refluxing reaction mixture. After the addition is complete, the refluxing is continued for an additional hour. The resulting mixture is then poured into ice water and extracted with ether. The ethereal extracts are combined, washed with water, dried sodium sulfate and evaporated. The residue is chromatographed on a silica-gel column, eluting with hexane:ethyl acetate (4:1) to yield 3,3-ethylenedioxy-17-spiro-(2',2'-dibromocyclopropyl)-5α-androstan-16α-ol and 3,3-ethylenedioxy - 17-spiro-(3',3'-dibromocyclopropyl)-5α-androstan-16α-ol.

Part C.—3,3-ethylenedioxy-17-vinylidene-5α-androstan-16α-ol 3,3 - ethylenedioxy - 17 - spiro - (gem-dibromocyclopropyl)-5α-androstan-16α-ol (2 g.) is dissolved in 50 ml. of diethyl ether under a nitrogen atmosphere and at room temperature. The thus prepared solution is then cooled to −10° C. To the cooled solution is added 3.5 molar equivalent of n-butyl lithium in diethyl ether in a dropwise fashion and with stirring over a period of 2 minutes. After the addition is complete, the resultant mixture is maintained at −10° C. for an additional 10 minutes. After this time, 35 ml. of water are cautiously added to the mixture. The ether layer is separated from the aqueous layer and is then washed several times with water until neutral. The neutral washed ether layer is then dried over magnesium sulfate. The dried material is distilled to a concentrate which is chromatographed to provide the 3,3-ethylenedioxy-17-vinylidene-5α-androstan-16α-ol product.

Part D.—3,3-ethylenedioxy-5α-pregnane-16α,17α,21-triol-20-one

To a solution of 250 mg. of 3,3-ethylenedoxy-17-vinylidene-5α-pregnan-16α-ol in 80 ml. of ether is added 1.0 g. of osmium tetroxide and 1 ml. of 3% aqueous hydrogen peroxide. The reaction mixture is allowed to stand at room temperature for 10 days and is then filtered. The ethereal filtrate is washed with sodium thiosulfate solution and water, dried over sodium sulfate and evaporated. The residue is purified on chromatographic magnesium silicate eluting with hexane and then with hexane:ethyl acetate (4:1) to yield 3,3-ethylenedioxy-5α-pregnane-16α,17α,21-triol-20-one.

EXAMPLE 5

Part A.—6α-methyl-9α-fluoro-17-methylene-5α-androstane-3β,11β-diol

A mixture of 1 liter of dimethylsulfoxide and 72 g. of sodium hydride was heated for one hour (about 70° C.). The resulting mixture is cooled and to the cooled mixture are added 357 g. of methyl triphenylphosphonium bromide in 1.5 liters of dimethylsulfoxide. The resulting reaction mixture is stirred for 5 hours at room temperature; then a solution of 382 g. of 3β-acetoxy-6α-methyl-9α-fluoro-5α-androstan-11,17-dione and 7.5 liters of xylene is slowly added with stirring. After the addition is complete, the mixture is stirred and heated to 50° C. and maintained under these conditions for 48 hours. The reaction mixture is allowed to cool, then is poured into ice water and extracted with methylene chloride. The extracts are combined, washed with water, dried over sodium sulfate and evaporated. The residue is chromatographed on magnesium silicate, eluting with hexane:ethyl acetate (9:1) to yield 6α-methyl-9α-fluoro-17-methylene-5α-androstane-3β,11β-diol.

Part B-1.—6α-methyl-9α-fluoro-17-spiro-(gem-dichloro-cyclopropyl)-5α-androstane-3β,11β-diol To a refluxing mixture of 272 g. of 6α-methyl-9α-fluoro-17-methylene-5α-androstane-3β,11β-diol, 90 g. of potassium tertiary butoxide, 5 liters of tertiary butanol, and 13 liters of dry toluene, there is slowly added a solution of 100 g. of chloroform and 1 liter of anhydrous toluene. After the addition, the mixture is refluxed for an additional 5 hours; then it is cooled and poured into ice water. The resulting aqueous mixture is extracted with diethyl ether; the extracts are combined, washed with water, dried over sodium sulfate, and evaporated. The residue is chromatographed on silica-gel eluting with hexane:ethyl acetate (4:1) to yield 6α-methyl-9α-fluoro-17-spiro-(2',2'-dichlorocyclopropyl) - 5α - androstane-3β,11β-diol and 6α-methyl-9α-fluoro - 17 - spiro-(3',3'-dichlorocyclopropyl)-5α-androstane-3β,11β-diol.

By employing 132 g. of bromodichloromethane and 168 g. of chlorodibromomethane in place of chloroform in the above process. the following are obtained, respectively; 6α-methyl-9α-fluoro - 17 - spiro-(2',2'-dichlorocyclopropyl)-5α-androstane-3β,11β-diol and the 3',3'-dichlorocyclopropyl derivative thereof, and 6α-methyl-9α-fluoro - 17 - spiro-(2'-bromo-2'-chlorocyclopropyl)-5α-androstane-3β,11β-diol and the 3'-chloro-3'-bromocyclopropyl derivative thereof.

Part B–2.—6α-methyl-9α-fluoro-17-spiro-(gem-dichloro-cyclopropyl)-5α-androstane-3β,11β-diol The procedure of Part B–2 of Example 1 is repeated using phenyltrichloromethyl mercury to afford the same product compounds.

Part C.—6α-methyl-9α-fluoro-17-vinylidene-5α-androstane-3β,11β-diol

6α-methyl-9α-fluoro - 17 - spiro-(gem-dichlorocyclopropyl)-5α-androstane-3β,11β-diol (1 gram) is dissolved in 250 ml. of diethyl ether under a nitrogen atmosphere. Following the preparation of the solution it is cooled to —80°. While maintaining the nitrogen atmosphere an excess of ethyl lithium in diethyl ether is added to the cooled solution in a dropwise fashion while stirring. The reaction mixture is then allowed to warm to room temperature and to it water is cautiously added. The organic layer is separated and removed from the aqueous layer, washed several times with water and dried over magnesium sulfate. The dried material is distilled and the concentrate gas chromatographed to provide the 6α-methyl-9α-fluoro-17-vinylidene-5α-androstane-3β,11β-diol product.

Part D.—6α-methyl-9α-fluoro-5α-pregnane-3β,11β,17α,21-tetraol-20-one

A mixture of 100 g. of 6α,9α-difluoro-17-vinylidene-5α-androstane-3β,11β-diol and 1.5 liters of diisopropyl ether is added to a mixture 102 g. of osmium tetroxide, 500 ml. of diisopropyl ether and 5 ml. of water. The resulting mixture is stirred for 4 days at 40° C., cooled and filtered. The filtrate is washed with aqueous sodium thiosulfate solution and water, dried over magnesium sulfate and evaporated. The residue is chromatographed on magnesium silicate eluting with isooctane to yield 6α-methyl-9α-fluoro-5α-pregnan-3β,11β,17α,21-tetraol-20-one.

EXAMPLE 6

Part A.—6β,16α-dimethyl-17-methylene-5α-androstane-3β-ol

A mixture of 4 liters of dimethylsulfoxide and 288 g. of sodium hydride was heated for 1 hour at 10° C. The resulting mixture is cooled and a mixture of 1076 g. of methyl triphenylphosphonium bromide in 4 liters of dimethylsulfoxide is added thereto. The resulting reaction mixture is stirred for 5 hours at room temperature; then a solution of 215 g. of 3β-propionyloxy-6β,16α-dimethyl-5α-androstane-17-one and 2.5 liters of toluene is slowly added with stirring. After the addition is complete, the mixture is stirred and heated to 50° C. for 48 hours. The reaction mixture is allowed to cool, then is poured into ice water and extracted with methylene chloride. The extracts are combined, washed with water, dried over sodium sulfate and evaporated. The residue is chromatographed on chromatographic magnesium silicate, eluting hexane:ethyl acetate (9:1) to yield 6β,16α-dimethyl-17-methylene-5α-androstan-3β-ol.

Part B.—6β,16α-dimethyl-17-spiro-(gem-dibromocyclopropyl)-5α-androstan-3β-ol

To a refluxing mixture of 186 g. of 6β,16α-dimethyl-17-methylene-5α-androstan-3β-ol, 56 g. of lithium, 3.5 liters of tertiary butanol and 0.5 liter of anhydrous xylene, there is slowly added a solution of 759 g. of bromoform and 4.5 liters of anhydrous toluene. After the addition, the mixture is refluxed for 3 hours; then it is cooled and poured into ice water. The resulting aqueous mixture is extracted with diethyl ether. The extracts are combined, washed with water, dried over sodium sulfate and evaporated. The residue is chromatographed on silica-gel eluting with hexane:ethyl acetate (4:1) to yield 6β,16α-dimethyl - 17 - spiro-(2′,2′-dibromocyclopropyl)-5α-androstan-3β-ol and 6β,16α-dimethyl-17-spiro-(3′,3′-dibromocyclopropyl)-5α-androstan-3β-ol.

Part C.—6β,16α-dimethyl-17-vinylidene-5α-androstan-3β-ol

A diethyl ether, phenyl lithium solution is prepared under a nitrogen atmosphere. While maintaining the nitrogen atmosphere, the solution is cooled to —80° C. After the mixture has reached this temperature, 1 equivalent of 6β,16α-dimethyl - 17 - spiro-(gemdibromocyclopropyl)-5α-androstan-3β-ol is added to the solution. The resultant mixture is allowed to stand at about —80° C. for 15 minutes, after which time it is allowed to slowly attain room temperature. After room temperature is reached, water is cautiously added to the reaction mixture. The organic layer is then separated and removed from the aqueous layer and is washed several times with water to neutrality. The neutral organic layer is then dried over magnesium sulfate and the bulk of the solvent removed by distillation. The concentrated material is chromatographed to obtain the 6β,16α-dimethyl-17-vinylidene-5α-androstan-3β-ol product.

Part D.—6β,16α - dimethyl-17α-(3′-chlorobenzoyloxy)-5α-pregnan-3β-ol-20-one and 6β,16α - dimethyl-21-(3′-chlorobenzoyloxy)-5α-pregnane-3β,17α-diol-20-one To a solution of 6β,16α-dimethyl-17-vinylidene-5α-pregnan-3β-ol dispersed in 20 ml. of chloroform are added 1.3 g. of 85% m-chloroperbenzoic acid. The resultant reaction mixture is allowed to stand at room temperature for 24 hours. After this period it is extracted with sodium bicarbonate, dried over sodium sulfate and evaporated. The residue after evaporation is chromatographed on Florisil eluting with benzene:2% ethyl acetate to provide the 6β,16α-dimethyl - 17α - (3′-chlorobenzoyloxy)-5α-pregnan-3β-ol-20-one and 6β,16α - dimethyl-21-(3′-chlorobenzoyloxy) - 5α - pregnane-3β,17α-diol products.

EXAMPLE 7

In accordance with the methods hereof and particularly by means of the methods of the process described in Parts A and B of the foregoing examples, the following 17-spiro-(gemdihalocyclopropyl)androstane compounds are prepared from the corresponding 3-hydroxy-(acyloxy)-17-keto androstane compounds:

6α-methyl-17-spiro-(2′,2′-dibromocyclopropyl) androstan-3β,16α-diol,
6β,16α-dimethyl-9α-fluoro-17-spiro-(2′-bromo-2′-chlorocyclopropyl)androstan-3β,11β-diol,
6α-methyl-17-spiro-(2′,2′-dibromocyclopropyl) androstan-3β,11β-diol,
17-spiro-(2′,2′-dibromocyclopropyl)androstane-3β,16α-diol,
1α,2α-oxido-17-spiro-(2′,2′-dibromocyclopropyl) androstan-3β-ol,
17-spiro-(2′-bromo-2′-chlorocyclopropyl)androstane-3β,11β-diol,
6α-fluoro-17-spiro-(2′,2′-dibromocyclopropyl) androstan-3β-ol,
9α,11β-oxido-17-spiro-(2′,2′-dibromocyclopropyl) androstan-3β-ol,
16α,16β-difluoro-17-spiro-(2′-bromo-2′-chlorocyclopropyl)-androstan-3β-ol,
6β-fluoro-17-spiro-(2′,2′-dibromocyclopropyl) androstan-3β,5α-diol,
1β,2β-methylene-17-spiro-(2′,2′-dibromocyclopropyl) androstan-3β-ol,
5,6-oxido-17-spiro-(2′,2′-dibromocyclopropyl) androstan-3β-ol,
16α-trifluoromethyl-17-spiro-(2′,2′-dibromocyclopropyl)androstan-3β-ol,
6α-fluoro-16α-acetoxy-17-spiro-(2′,2′-dichlorocyclopropyl)androstan-3β-ol,
6α-fluoro-16α-methyl-17-spiro-(2′,2′-dichlorocyclopropyl)androstan-3β-ol, 17-spiro-(2',2'-dichlorocyclopropyl)androstane-3β,11β-diol,
3β-acetoxy-4β-methyl-17-spiro-(2'-bromo-2'-chlorocyclopropyl)androstane,
2-fluoro-17-spiro-(2',2'-dichlorocyclopropyl)androstan-3β-ol,
9α-chloro-16β-methyl-11β-hydroxy-17-spiro-(2'-bromo-2'-dichlorocyclopropyl)androstan-3β-ol, and
9α-fluoro-17-spiro-(2',2'-dichlorocyclopropyl)androstan-3β-ol, and the corresponding 3',3' - dibromocyclopropyl) and (3',3' - dichlorocyclopropyl) and (3' - bromo-3'-chlorocyclopropyl) derivatives thereof.

EXAMPLE 8

In accordance with the methods hereof and particularly by means of the methods of the process described in Parts C and D of the foregoing examples, the above listed (Example 7) compounds can be converted to the corresponding 17α-hydroxy(acyloxy)-20 - keto and 17α,21-dihydroxy(acyloxy)-20-keto compounds to wit, 6α-methylpregnane-3β,16α,17α,21-tetraol-20-one,
6β,16α-dimethyl-9α-fluoropregnane-3β,11β,17α,21-tetraol-20-one,
6α-methylpregnane-3β,11β,17α,21-tetraol-20-one,
pregnane-3β,16α,17α,21-tetraol-20-one,
1α,2α-dioxidopregnane-3β,17α,21-triol and so forth,
3β,21-acetoxy-6α-methylpregnane-16α,17α-diol-20-one,
3β,21-diacetoxy-6β,16α-dimethyl-9α-fluoropregnane-11β,17α-diol-20-one,
3β,21-diacetoxy-6α-methylpregnane-11β,17α-diol-20-one,
3β,16α,21-triacetoxypregnan-17α-ol-20-one,
1α,2α-oxido-3β,21-diacetoxypregnan-17α-ol-20-one, and so forth, 6α-methyl-17α-(3'-chlorobenzoyloxy)pregnane-3β,16α-diol-20-one,
6β,16α-dimethyl-9α-fluoro-17-(3'-chlorobenzoyloxy)pregnane-3β,11β-diol-20-one,
6α-methyl-17α-(3'-chlorobenzoyloxy)pregnane-3β,11α-diol-20-one,
17α-(3'-chlorobenzoyloxy)pregnane-3β,16α-diol-20-one,
1α,2α-oxido-17α-(3'-chlorobenzoyloxy)pregnane-3β-ol-20-one, and so forth, 6α-methyl-21-(3'-chlorobenzoyloxy)pregnane-3β,16α,17α-triol-20-one,
6β,16α-dimethyl-9α-fluoro-21-(3'-chlorobenzoyloxy)pregnane-3β,11β,17α-triol-20-one,
6α-methyl-21-(3'-chlorobenzoyloxy)pregnane-3β,11β,17α-triol-20-one,
21-(3'-chlorobenzoyloxy)pregnane-3β,16α,17α-triol-20-one,
1α,2α-oxido-21-(3'-chlorobenzoyloxy)pregnane-3β,17α-diol-20-one, and so forth.

EXAMPLE 9

In accordance with Example 8, the corresponding 17α- and 21-esters in the 17α-hydroxy-20-keto and 17α,21-dihydroxy-20-keto series are prepared upon substituting the following carboxylic acid anhydrides: acetic anhydride, propionic anhydride, pentanoic anhydride, trimethylacetic anhydride, and caproic anhydride, to respectively prepare the following compounds:

6α-methyl-17α-acetoxypregnane-3β,16α-diol-20-one,
6β,16α-dimethyl-9α-fluoro-17α-acetoxypregnane-3β,11β-diol-20-one,
6α-methyl-17α-acetoxypregnane-3β,11β-diol-20-one,
17α-acetoxypregnane-3β,16α-diol-20-one,
1α,2α-oxido-17α-acetoxypregnan-3β-ol-20-one and so forth,
6α-methyl-21-acetoxypregnane-3β,16α,17α-triol-20-one,
6β,16α-dimethyl-9α-fluoro-21-acetoxy-3β,11β,17α-triol-20-one,
6α-methyl-21-acetoxypregnane-3β,11β,17α-triol-20-one,
21-acetoxypregnane-3β,16α,17α-triol-20-one,
1α,2α-oxido-21-acetoxypregnan-3β,17α-diol-20-one, and
6α-methyl-17α-pentanoyloxypregnane-3β,16α-diol-20-one,
6β,16α-dimethyl-9α-fluoro-17α-pentanoyloxypregnane-3β,11β-diol-20-one,
6α-methyl-17α-pentanoyloxypregnane-3β,11β-diol-20-one,
17α-pentanoyloxypregnane-3β,16α-diol-20-one,
1α,2α oxido 17α-pentanoyloxypregnan-17α-diol-20-one,
6β,16α-dimethyl-21-pentanoyloxypregnan-3β,17α-diol-20-one, and so forth.

EXAMPLE 10

The procedure of part D-2 of Example 1 is repeated utilizing trifluoroperacetic acid, peracetic acid, perbenzoic acid and perphthalic acid in lieu of m-chloroperbenzoic acid to respectively prepare 3β-acetoxy-17α-trifluoroacetoxy - 5α-pregnan-20-one, 3β-acetoxy-21-trifluoroacetoxy-5α-pregnan-17α-ol-20-one, 3β,17α-diacetoxy-5α-pregnan-20-one, 3β,21-diacetoxy-5α-pregnan-17α-ol-20-one, 3β-acetoxy - 17α-benzoyloxy-5α-pregnan-20-one, 3β-acetoxy-21-benzoyloxy - 5α-pregnane-17α-ol-20-one, 3β-acetoxy-17α-phthaloyloxy - 5α - pregnan - 20-one, and 3β-acetoxy-21-phthaloyloxy-5α-pregnan-17α-ol-20-one.

In like manner the foregoing peracids can be employed in the corresponding preparation of the 17α-and 21-esters of those compounds listed in Example 8, that is, 6α-methyl - 17α - trifluoroacetoxypregnan-3β,16α-diol-20-one 6β,16α - dimethyl-9α-fluoro-17α-trifluoroacetoxypregnane-3β,11β-diol-20-one, and so forth.

The following examples are illustrative of the further elaboration which can be performed upon the products of the principal processes hereof.

EXAMPLE 11

A solution of 6 g. of 17α-acetoxy-5α-pregnan-3β-ol-20-one in 120 ml. of pyridine is added to a mixture of 6 g. of chromic trioxide in 20 ml. pyridine. The reaction mixture is allowed to stand at room temperature for 15 hours, diluted with ethyl acetate and filtered through Celite diatomaceous earth. The filtrate is washed well with water, dried and evaporated to dryness to yield 17α-acetoxy-5α-pregnane-3,20-dione.

Two equivalents of bromine in 15 ml. of glacial acetic acid are added dropwise to a solution of 1 g. of 17α-acetoxy-5α-pregnane-3,20-dione in 25 ml. of acetic acid containing a few drops of 4 N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and evaporated under reduced pressure. The residue is dissolved in 35 ml. of acetone, and treated under carbon dioxide with an aqueous solution of 11 g. of chromic chloride. After allowing the mixture to stand at room temperature for 20 minutes, water is added and the mixture is extracted with ether. These extracts are washed with water to neutrality, dried and evaporated. The residue is mixed with 0.8 g. of potassium carbonate in 35 ml. of methanol and 7 ml. of water and refluxed for 30 minutes. The mixture is extracted with chloroform and these extracts are chromatographed on alumina with 7:3 chloroform:benzene to yield 17α-acetoxypregn-4-ene-3,20-dione.

In the manner corresponding with that described above in this example, the other corresponding 3-hydroxy-5α-compounds prepared as described above can be converted to the corresponding 3-keto-Δ⁴ compounds. In those instances in which the compound also contains a hydroxyl group which competes with the oxidation step (Paragraph 1 above) it is preferable to first protect these groupings such as by forming the 16,17-isopropylidenedioxy grouping in accordance with standard procedures or by standard etherification or esterification at C–16α and C–21. These procedures can be illustrated as follows:

To 120 ml. of acetone containing 1 g. of 5α-pregnane-3β,16α,17α,21-tetraol-20-one are added 30 drops of 70% perchloric acid. The mixture is allowed to stand 1 hour at room temperature, 30 drops of pyridine are added and the solution is evaporated to dryness under reduced pressure. Thirty milliliters of water are added to the residue and this mixture is extracted several times with ethyl acetate. The combined extracts are washed to neutrality with water, dried over sodium sulfate and evaporated to dryness. The residue upon trituration with methanol yields 16α,17α-isopropylidenedioxy-5α-pregn-3β,21-diol-20-one.

The latter prepared compound when treated in accordance with Paragraphs 1 and 2 of this example is converted to 16α,17α - isopropylidenedioxypregn - 4-en-21-ol-3,20-dione.

EXAMPLE 12

One gram of pregn-4-ene-11β,17α,21-triol-3,20-dione is dissolved with slow heating in 12.5 ml. of dimethylformamide. To the cooled mixture is then added 0.42 g. of methanesulfonyl chloride and 0.5 ml. of pyridine. After heating the reaction mixture at 80° C. for 30 minutes it is cooled, diluted with water, and extracted with ethyl acetate the extracts are washed with water dried over sodium sulfate and evaporated to yield pregna-4,9(11)-diene-17α,21-diol-3,20-dione which may be further purified by recrystallization from acetone:hexane.

To a solution of 1.6 g. of pregna-4,9(11)-diene-17α,21-diol-3,20-dione in 4 ml. of chloroform is added over a 5 minute period with continuous stirring, a solution of 0.3 g. of chlorine in 10 ml. of carbon tetrachloride. After being allowed to stand at room temperature for 20 minutes, the mixture is treated with 10 ml. of 5% aqueous sodium carbonate solution and extracted with chloroform. The chloroform extracts are washed with water to neutrality, dried over sodium sulfate and evaporated to dryness to yield 9α,11β-dichloropregn-4-ene-17α,21-diol-3,20-dione which may be recrystallized from acetone:hexane.

EXAMPLE 13

To a suspension of 1 g. of 16α-methylpregn-4-ene-11β,17α,21-triol-3,20-dione in 7.5 ml. of anhydrous, peroxide-free dioxane are added 1.2 ml. of freshly distilled ethyl orthoformate and 0.8 g. of p-toluene sulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-16α-methylpregna-3,5-dione-11β,17α-triol-20-one which is recrystallized from acetone:hexane.

A mixture of 5 g. of 3-ethoxy-16α-methylpregna-3,5-diene-11β,17α,21-triol-20-one, 2 g. of anhydrous sodium acetate and 100 ml. of acetone is treated with 32 ml. of water. The solution is cooled to 5° C. and 1.1 molar equivalents of n-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-16α-methylpregn-4-ene-11β,17α,21-triol-3,20-dione which is recrystallized from acetone. The corresponding 6α-chloro compound is obtained by dissolving this compound in glacial acetic acid and introducing a slow stream of anhydrous hydrogen chloride over a period of four hours and a temperature of 15° C. The solid which forms upon pouring this mixture into water is collected by filtration, washed with water and dried to yield 6α-chloro-16α-methylpregn-4-ene-11β,17α,21-triol-3,20-dione which is recrystallized from acetone:hexane.

EXAMPLE 14

A mixture of 0.5 g. of 9α,11β-dichloropregn-4-ene-17α, 21-diol-3,20-dione, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield 9α,11β-dichloropregna-1,4-diene-17α,21-diol-3,20-dione which is further purified by recrystallization from acetone:hexane.

A mixture of 1 g. of 9α,11β-dichloropregn-4-ene-17α, 21-diol-3,20-dione, 2 g. of chloranil, 15 ml. of ethyl acetate and 5 ml. of acetic acid is refluxed under nitrogen for 96 hours. The mixture is then cooled and washed with cold 10% aqueous sodium hydroxide until the washings were colorless. The organic solution is dried over sodium sulfate and the ethyl acetate removed by evaporation. Upon chromatography of the residue on neutral alumina there is obtained 9α,11β-dichloropregna-4,6-diene-17α,21-dione, which may be further purified by recrystallization from acetone:hexane.

What is claimed is:
1. The process which comprises the steps of:
   (a) treating a suitably protected 17-keto androstane with methylene triphenylphosphorane to yield the corresponding 17-methyleneandrostane;
   (b) treating the resulting 17-methyleneandrostane with a dihalocarbene, wherein the halogen is bromo or chloro, to yield the corresponding 17-spiro-(gem-dihalocyclopropyl)-androstane;
   (c) treating the thus prepared 17-spiro-(gem-dihalocyclopropyl)-androstane with a lower alkyl lithium or phenyl lithium to yield the corresponding 17-vinylideneandrostane;
   (d) oxidizing the resulting 17-vinylideneandrostane with osmium tetroxide, either alone or in combination with hydrogen peroxide, phenyliodoso acetate, or morpholine to prepare the corresponding 17α,21-dihydroxy-20-keto compound or with a percarboxylic acid to prepare the corresponding 17α-acyloxy-20-keto and 17α-hydroxy-21-acyloxy-20-keto compounds.
2. The process according to claim 1 wherein
   step (a) is conducted in the presence of an inert aprotic organic solven having a high dielectric constant;
   step (b) is conducted by generating the dihalocarbene from a haloform and an alkali metal tertiary alkoxide or from a phenyltrihalomethyl mercury;
   step (c) is conducted in the presence of an inert liquid organic reaction medium; and
   step (d) is conducted with osmium tetroxide or a percarboxylic acid at a temperature between 0° C. and the boiling point of the reaction mixture.
3. The process according to claim 1 wherein
   step (a) is conducted with methylene triphenylphosphorane in a di(hydrocarbon)sulfoxide, alone or in combination with an inert hydrocarbon solvent or an organic ether solvent under an inert gas atmosphere;
   step (b) is conducted by refluxing with dihalocarbene, the dihalocarbene being generated from a haloform and an alkali metal tertiary alkoxide or from a phenyltrihalomethyl mercury;
   step (c) is conducted with a lower alkyl lithium or phenyl lithium in an inert liquid organic reaction medium at a temperature ranging from −50° to about 30° C.; and step (d) is conducted at about room temperatures and in an inert gas atmosphere with osmium tetroxide in an inert organic ether solvent or with percarboxylic acid in an inert hydrocarbon hydrocarbon solvent.

4. The process according to claim 1 wherein step (d) is conducted with osmium tetroxide so as to prepare a 17α,21-dihydroxy-20-keto pregnane.

5. The process according to claim 1 wherein step (d) is conducted with a percarboxylic acid to prepare the corresponding 17α-acyloxy - 20 - keto pregnane and 17α-hydroxy-21-acyloxy-20-keto pregnane.

6. The process which comprises the steps of:
 (a) treating a 17-ketoandrostane with methylene triphenylphosphorane to yield the corresponding 17-methyleneandrostane;
 (b) treating the resulting 17-methyleneandrostane with a dihalocarbene, wherein the halogen is bromo or chloro, to yield the corresponding 17-spiro-(gem-dihalocyclopropyl)-androstane; and
 (c) treating the thus prepared 17-spiro-(gem-dihalocyclopropyl)-androstane with a lower alkyl lithium or phenyl lithium to yield the corresponding 17-vinylideneandrostane.

7. The process according to claim 6 wherein
step (a) is conducted in the presence of an inert aprotic organic solvent having a high dielectric constant;
step (b) is conducted by generating the dihalocarbene from a haloform and an alkali metal tertiary alkoxide or from a phenyltrihalomethyl mercury; and
step (c) is conducted in the presence of an inert liquid organic reaction medium.

8. The process according to claim 6 wherein
step (a) is conducted with methylene triphenylphosphorane in a di(hydrocarbon)sulfoxide, alone or in combination with an inert hydrocarbon solvent or an organic ether solvent under an inert gas atmosphere;
step (b) is conducted by refluxing with dihalocarbene, the dihalocarbene being generated from a haloform, and an alkali metal tertiary alkoxide or from a phenyltrihalomethyl mercury; and
step (c) is conducted with a lower alkyl lithium or phenyl lithium in an inert liquid organic reaction medium at a temperature ranging from −50° to about 30° C.

9. A compound according to the formula

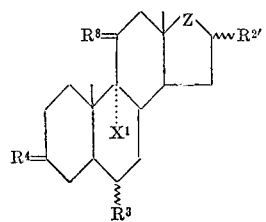

wherein Z is

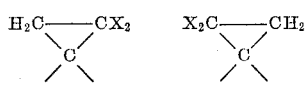

in which
 X is bromo or chloro;
 $R^{2\prime}$ is hydrogen, methyl, hydroxy or a conventional hydrolyzable ester or ether thereof;
 $R^3$ is hydrogen, fluoro, chloro, bromo or methyl;
 $R^4$ is oxo, ethylenedioxy or the group

wherein
 $R^5$ is hydrogen, hydroxy, or a conventional hydrolyzable ester or ether thereof;
 $R^8$ is oxo or the group

wherein
 $R^9$ is hydrogen, hydroxy or chloro;
 $X^1$ is hydrogen, fluoro, chloro or bromo, provided $X^1$ is chloro when $R^9$ is chloro.

10. A compound according to claim 9 wherein X is bromo.

11. A compound according to claim 9 wherein X is chloro.

12. A compound according to claim 9 wherein $R^{2\prime}$ is α-methyl, $R^3$ is a hydrogen, $R^4$ is the group

in which $R^5$ is hydroxy, $R^8$ is the group

in which $R^9$ is hydroxy, and $X^1$ is hydrogen.

13. A compound according to claim 9 wherein $R^{2\prime}$ is hydrogen, $R^3$ is hydrogen, $R^4$ is the group

in which $R^5$ is hydroxy, $R^8$ is the group

in which $R^9$ is hydroxy and $X^1$ is hydrogen.

14. A compound according to claim 9 wherein $R^{2\prime}$ is α-hydroxy, $R^3$ is hydrogen, $R^4$ is the group

in which $R^5$ is hydroxy, $R^8$ is the group

in which $R^9$ is hydroxy and $X^1$ is fluoro.

15. A compound according to claim 9 wherein $R^{2\prime}$ is α-hydroxy, $R^3$ is hydrogen, $R^4$ is the group

in which $R^5$ is tetrahydropyran-2-yloxy, $R^8$ is the group

in which $R^9$ is hydroxy and $X^1$ is hydrogen.

References Cited
UNITED STATES PATENTS 3,376,323   4/1968   Fried _____ 260—397.3

LEWIS GOTTS, Primary Examiner

E. G. LOVE, Assistant Examiner

U.S. Cl. X.R.

260—397.3, 397.4, 397.45, 397.5

UNITED STATES PATENT OFFICE
CERTIFICATE OF CORRECTION

Patent No. 3,637,670                    Dated   January 25, 1972

Inventor(s)  John H. Fried

It is certified that error appears in the above-identified patent and that said Letters Patent are hereby corrected as shown below:

Column 3, line 26, after "heptane" and before "isoctane" insert a comma.
Column 3, line 32, "disopropyl" should be -- diisopropyl --.
Column 3, line 74, "alkaxodies" should be -- alkoxides --.
Column 4, line 44, "Rheinhold" should be -- Reinhold --.
Column 6, line 17, after "$R^6$" and before "oxido" insert a comma.
Column 6, line 36, "alse" should be -- also --.
Column 6, line 51, "useful" should be -- use --.
Column 6, line 64, "The" should be -- This --.
Column 7, line 14, "compounds" should be -- compound --.
Column 7, line 23, "groups" should be -- group --.
Column 8, line 30, "chloropropinoate" should be -- chloropropionate --.
Column 8, line 49, after "acetic" and before "propionic" insert a comma.
Column 12, line 70, "vinylidene15α-" should be -- vinylidene-5α- --.
Column 17, line 13, "3',3'-dibromocyclopropyl)" should be -- (3',3'-dibromocyclopropyl) --.
Column 18, line 36, at the end of the line, insert a comma.
Column 19, line 61, "-3,5-dione-" should be -- -3,5-diene- --.
Column 21, line 1, "temperatures" should be -- temperature --.
Column 21, lines 56 through 59, (Claim 9), the formulas should appear as follows:

UNITED STATES PATENT OFFICE
CERTIFICATE OF CORRECTION

Patent No. 3,637,670    Dated  January 25, 1972

Inventor(s) John H. Fried    Page -2-

It is certified that error appears in the above-identified patent and that said Letters Patent are hereby corrected as shown below:

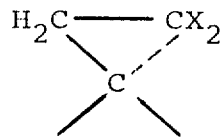   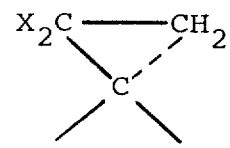

Column 22, line 10 (Claim 9), the definition of $R^8$ should appear as follows:
"$R^8$ is oxo or the group

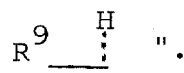

".

Signed and sealed this 5th day of December 1972.

(SEAL)
Attest:

EDWARD M. FLETCHER, JR.
Attesting Officer

ROBERT GOTTSCHALK
Commissioner of Patents